Figure 1:
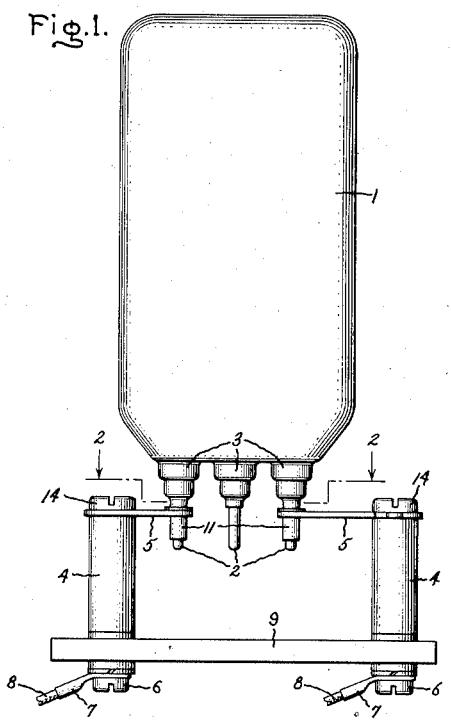

April 22, 1958     H. L. THORSON     2,832,057

SHOCK MOUNT FOR ELECTRIC DISCHARGE DEVICES

Filed July 5, 1951

Inventor:
Harry L. Thorson,
by Merton D Morse
His Attorney.

United States Patent Office 2,832,057
Patented Apr. 22, 1958

2,832,057
SHOCK MOUNT FOR ELECTRIC DISCHARGE DEVICES

Harry L. Thorson, Schenectady, N. Y., assignor to General Electric Company, a corporation of New York Application July 5, 1951, Serial No. 235,270

7 Claims. (Cl. 339—93)

My invention relates in general to shock mounts and in particular to shock mounts especially suitable for supporting and connecting electric discharge tubes and lamps.

In the application of electric discharge devices, the need for an improved electrically-connecting and shock-protective mount has become evident, especially in airborne electronic equipment, for example, since the use of conventional prong-and-socket discharge device connecting mounts may result in unsatisfactory operation or failure of the devices so mounted. In applications subjecting electric discharge tubes, which are generally fragile by nature, to high operating temperatures, shocks, or vibrations, the well-known prong-and-socket mount first presents the possibility of a discharge tube mounted therein popping out of the socket. Secondly, if the socket is designed reasonably to insure against tube pop-out, it affords such rigid support that any reasonable measure of shock protection is precluded, and electrode damage within the tube may result. Thirdly, slight vibrations or dust and dirt deposits between a prong and its socket may cause an arcing therebetween, which produces an electrically resistive oxide. The resistive oxide in turn causes greater heating at the cooperating surfaces, which produces a greater amount of resistive oxide and more heat in a cumulative process, which may cause burnout of a prong and socket or a relatively great contact resistance which may seriously impair the operation of the discharge tube. Also, discharge tubes with conventional prong bases, provided to protect the envelope-to-prong hermetic seals against stresses particularly manifest during insertion or removal of the prongs into or from a socket, are somewhat limited in operation at high ambient temperatures by the possible decomposition of the basing compound or cement, which loosens the fastening between the base and the tube envelope.

It is an object of my invention to provide a new and improved mounting structure for removably supporting and connecting an electric discharge device.

It is another object of my invention to provide a connecting and supporting mount for electric discharge devices which makes possible positive mechanical fastening of the discharge devices to terminals and supporting members.

It is another object of my invention to provide an electrically connecting and mechanically supporting mount for electric discharge devices which is shock and vibration protective.

It is still another object of my invention to provide an electrically connecting and mechanically supporting shock mount for electric discharge devices which affords positive electrical connection not affected by dust, dirt, or vibration.

It is still another object of my invention to provide a connecting and supporting shock mount for electric discharge devices which accommodates the employment of discharge devices having no conventional base or basing compound and, therefore, reliably operable at high temperatures.

In carrying out the objects of my invention in one form thereof, I provide a connecting and supporting shock mount for an electric discharge device having external connector pins comprising a plurality of metal straps, each having an opening in one end thereof through which one of the connector pins is inserted and by means of which the strap is fastened, preferably rigidly fastened, by bonding, to the connector pin, extending laterally from the connector pin. The straps are formed at the other ends thereof, as by a slot or hole therein, to be removably fastened to a plurality of spaced terminals in registry with the slots or holes by means of a removable threaded fastener cooperating with a threaded portion of the terminals so as to securely fasten the straps to the terminals. The rigid fastening of the straps to the connector pins and the secure fastening of the straps to the spaced terminals provides support for the discharge tube which permits no possibility of the tube being jarred or shaken loose. The straps, in effect, serve as a plurality of cantilever members which, by any degree of resiliency given to them, absorb and cushion any shocks or vibrations which might otherwise be damaging to the internal structure of the electric discharge device. For the same reasons that the tube is positively supported mechanically, it is also positively connected electrically at both ends of the metal straps so that any vibration or dust or dirt cannot cause any arcing or resistive oxidation between contacting surfaces that might become cumulative and impair the electrical operation of the discharge device. Since the discharge device is supported entirely by the laterally extending cantilever metal straps, which are removed from the spaced terminals when the device is removed, and is in contact with no other objects, the connector pins and envelope seals therearound are not subjected to appreciable stress and the device may be made of a baseless construction with the connector pins extending directly from the tube envelope, so that higher temperatures in operation may be safely accommodated.

Figure 2:
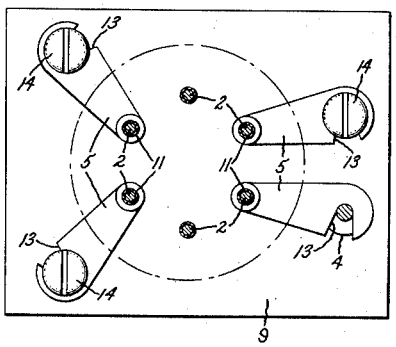
Figure 3:
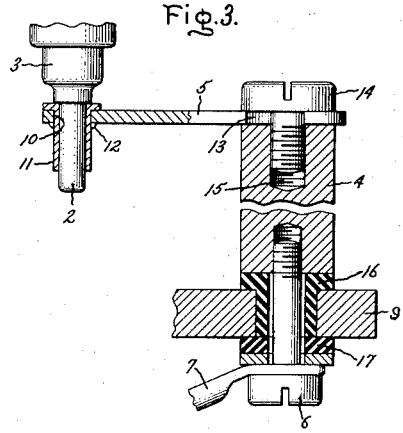
Figure 4:
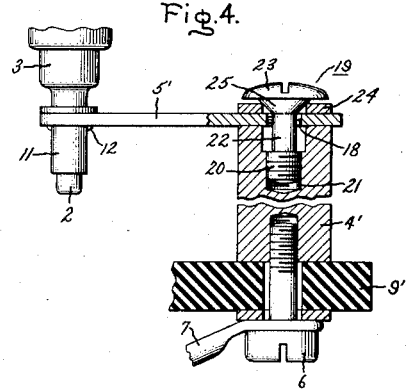
Figure 5:
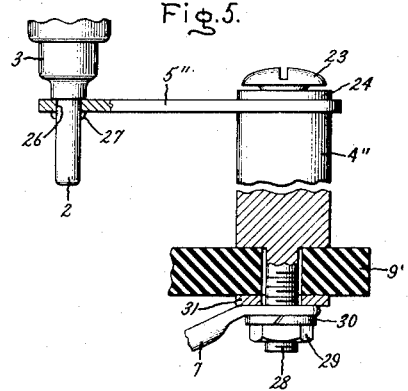

For a better understanding of the present invention, together with further objects and advantages thereof, reference should be had to the following description taken in conjunction with the accompanying drawing, wherein:

Fig. 1 is an elevational view of an electrically connecting mount supporting an electric discharge device with cushioning and shock protection according to a first embodiment of my invention; Fig. 2 is a plan view in section taken along line 2—2 of Fig. 1; Fig. 3 is an elevational view in section of a part of Fig. 1 illustrating in greater detail the embodiment of the electrically connecting and supporting shock mount shown in Fig. 1; Fig. 4 is similar to Fig. 3 except that it illustrates a second embodiment of my invention; and Fig. 5 is similar to Fig. 4, illustrating further modifications in the shock mount of my invention.

Referring now to the drawing, I have shown in Figs. 1, 2 and 3 a first embodiment of the shock mount of my invention, illustrating in Fig. 1 an electric discharge device having a glass tube envelope 1 through the lower portion of which a plurality of parallel external metal connector pins 2 extend with a plurality of metal sealing thimbles 3, preferably of fernico to facilitate a metal-to-glass seal, bonded between the glass and the pins 2 to assure hermetical sealing of envelope 1.

The electric discharge device is supported from and electrically connected to a plurality of spaced terminals 4 by the shock mount which includes a plurality of conductive metal straps 5. Terminals 4, in turn, are adapted to be fastened in upright position by means of screw fasteners 6, which also may conveniently secure lugs 7 on lead wires 8 in electrical connection thereto, in insulated relation to a supporting member or panel 9. Each of straps 5 is fastened at one end thereof to one of pins 2, preferably rigidly fastened in the proper orientation, so that it extends laterally outward from the associated pin 2 and envelope 1, with its outer end in registry with one of spaced terminals 4. Each of straps 5 has defined in the inner end thereof an opening 10 as shown in Fig. 3. To effect this fastening without damaging the hermetic seals between pin 2 and straps 5, a flanged metal eyelet 11 is first inserted through each of openings 10 in straps 5 and a bond at 12 made, by welding or brazing, between the eyelet 11 and its cooperating strap 5, on one side of strap 5 opposite the flange. Rigidly to secure the straps 5 to the pins 2 without damaging the seals of envelope 1, each eyelet 11 is slipped over one of pins 2 as shown and the eyelet 11 then spot welded to the pin 2 with the strap 5 in any predetermined orientation to be in registry with one of spaced terminals 4.

Each of straps 5 is formed at the outer end thereof to be removably fastened to one of spaced terminals 4, in the first embodiment formed to define a transverse slot 13 therein which cooperates with a threaded fastener or screw fastener 14 screwed into an axially threaded portion or opening 15 in the upper end of the terminal 4. Slots 13 in straps 5 are all oriented in the same circumferential direction so that, as illustrated most clearly in Fig. 2, screws 14 may be loosened and envelope 1 rotated about an axis parallel to pins 2 to place or remove the outer ends of straps 5 at slots 13 in or from position to be securely fastened to terminals 4 by the tightening of screw fasteners 14.

As shown more clearly by Fig. 3, if panel 9 is made of electrically conductive material such as metal, each terminal 4 may be insulated therefrom by an insulating bushing 16 and an insulating washer 17. The panel 9 and the spaced terminals 4 may be of any configuration to permit the discharge device to be supported entirely through straps 5 so that pins 2 do not derive support from panel 9 or are not short circuited by panel 9 if it is made of a conducting material. The post-like construction of spaced terminals 4 provides a preferred such structure for supporting the discharge tube 1 solely through straps 5, the extremities of pins 2 being held away from panel 9 thereby preventing rigid support or electrical short circuit of the pins 2 by panel 9. If an opening larger than the circular space defined by pins 2 were provided in panel 9, it will be obvious that straps 5 could extend laterally for connection to and support from spaced terminals relatively flush with the surface of panel 9, the extremities of pins 2 extending through such an opening and being free from rigid support or short circuit by the panel 9.

The first embodiment of the shock mount of my invention illustrated by Figs. 1, 2 and 3, therefore, provides removable support and connection for discharge tube 1, since screw fasteners 14 may be loosened slightly, tube 1 rotated about an axis parallel to pins 2, and then lifted free of terminals 4. The degree of fastening tightness afforded by screw fasteners 14 at the outer ends of straps 5 and the rigid fastening between the straps 5 and pins 2 make certain that no tube can be knocked from its support due to a shock, and that no dust or dirt can be deposited between contacting surfaces to cause contact resistance build-up and resultant burning of contacting surfaces with impaired electrical operation of the mounted discharge device. The material, length, and thickness of straps 5 may be chosen to impart to them any desired degree of resiliency and flexibility and, since straps 5 form a plurality of cantilevers solely supporting tube 1, they provide cushioning of tube 1 against shocks or jars and vibrations, thereby protecting the electrodes in the discharge device from damage and displacement which might otherwise occur as a result of shocks and vibrations.

Turning next to Fig. 4, there is illustrated a second embodiment of my invention which is similar to the first embodiment described in connection with Figs. 1, 2 and 3, except for the manner in which the outer ends of straps 5' are formed to be removably fastened to spaced terminals 4'. Panel 9' is also illustrated in a preferred form as being of an insulating material, so that the necessity for insulating bushing 16 and insulating washer 17 between terminal 4' and screw fastener 6 and panel 9 is eliminated. In this second embodiment, each of straps 5' is formed to define a threaded opening 18 in the outer end thereof, and is provided with a screw fastener 19 held axially captive within opening 18. Screw fastener 19 has a threaded body portion 20 for cooperation with threaded opening 18 and with the threaded portion of a counterbored, axially threaded opening 21 in terminals 4', a neck portion 22 of diameter smaller than that of body portion 20, and a head portion 23. A lock washer 24 may be placed around neck portion 22, and body portion 20 then screwed completely through opening 18, so that screw fastener 19 is held captive with rotational and limited axial freedom within threaded opening 18. Thus, to fasten strap 5' to terminal 4', it is only necessary to place opening 18 in registry with opening 21 and tighten screw fastener 19; to remove the tube 1 from support and connection to terminal 4', it is only necessary to loosen screw fastener 19 and lift tube 1 from terminal 4, screw fastener 19 being retained captive, without possibility of loss within opening 18.

The positive mechanical support and electrical connection, as well as the shock and vibration protective advantages of the first described embodiment of my shock mount apply equally as well to the embodiment illustrated by Fig. 4. A further advantage of this second embodiment is that screw fasteners 19, as well as straps 5', are always held in association with tube 1 with very little likelihood of being lost, and are therefore constantly available for quickly fastening the discharge device in service. However, it should be noted that the counterbored portion of opening 21 should be as great or greater in length as the body portion 20 in order that, when body portion 20 is being removed from threaded engagement with opening 21, it does not engage threaded opening 18 and present the possibility of working itself out of captivity within opening 18. A tapered collar portion 25 may be provided between neck portion 22 and head portion 23 on screw fastener 19 to automatically center lock washer 24 as screw fastener 19 is tightened into threaded engagement with terminal 4' in opening 21.

Referring next to Fig. 5, I have shown further modifications which may be advantageously employed in carrying out the objects of my invention. The first of these modifications lies in the omission of eyelet 11 between the strap 5" and the associated connector pin 2, the strap 5" having an opening 26 defined in one end thereof, which provides a relatively close fit between strap 5" and the associated pin 2 inserted therethrough. The upper surface of strap 5" may bear against thimble 3 and a bond at 27 rigidly fastens strap 5" to pin 2, with strap 5" extending laterally outward from pin 2 in any predetermined orientation to register with a spaced terminal 4". This construction is preferred over that shown in connection with Figs. 3 and 4, since eyelets 11 are eliminated. However, the bonding at 27 is more critical to successfully effect, without damaging the hermetic seal between thimble 3 and pin 2. If the strap 5" and pin 2 are made of Monel metal, for example, the bond at 27 may be made by silver brazing in a hydrogen atmosphere with little likelihood of damaging the hermetic seal. Secondly, as illustrated by Fig. 5, terminal 4", if made post-like in form, may be machined with a threaded stud 28 on one end thereof so that it may be secured to panel 9' by a nut fastener 29, which may also secure a lead wire lug 7 and two washers 30 and 31. This form of terminal may also be employed on a conductive panel by insulating it from the conductive panel with means similar to bushing 16 and washer 17.

From the foregoing description, it is seen that the shock mount of my invention provides positive mechanical support and electrical connection for an electric discharge device and, at the same time, provides cushioning against shocks and vibrations. The present invention involves no sliding socket contacts which may loosen and not only permit tube pop-out but also build up high contact resistance due to extraneous matter and arcing during vibration. My invention further provides removable support and connection for an electrical discharge tube, such removability being accomplished by threaded fasteners so that very little strain is put on the tube connector pins and the hermetic seals therearound during insertion or removal of the discharge device into or from service. For these reasons, a discharge tube having no base for protecting and strengthening such seals may be employed and operated at high temperatures without fear of decomposition of a basing compound.

In the foregoing specification and the appended claims the expression "discharge device" is used to designate electrical devices similar in construction to vacuum tubes, having hermetically sealed envelopes and internal connector pins extending therefrom, such for example as electric lamps. While the present invention has been described by reference to particular embodiments thereof, it will be understood that numerous modifications may be made by those skilled in the art without actually departing from the spirit of the invention. I, therefore, aim in the appended claims to cover all such equivalent variations as come within the true spirit and scope of the foregoing disclosure.

What I claim as new and desire to secure by Letters Patent of the United States is:

1. In combination, an electric discharge device having a plurality of external connector pins extending therefrom in parallel relation and a connecting shock mount for supporting said device and connecting said connector pins to a plurality of spaced terminals, said shock mount comprising a plurality of metal straps each rigidly fastened at one end thereof to one of said pins and extending laterally from said one pin, said straps being flexible in a direction substantially coextensive with said pins, a transverse slot being defined in each of said straps at the end thereof opposite said one end, whereby said discharge device may be rotated substantially about its axis to move said slots onto said terminals.

2. In combination, an electric discharge device having a plurality of external connector pins extending therefrom in parallel relation and an electrically connecting and mounting structure for removably securing said electric discharge device to a supporting member, said structure comprising a terminal post adapted to be fastened in an upright position to said supporting member, a flexible conductive arm having an opening defined in one end thereof and a slot transverse to the axis of said arm in the other end thereof, a flanged eyelet surrounding one of said pins and bonded thereto, said eyelet being inserted through said opening and bonded to said arm, and a threaded fastener cooperating with a threaded portion provided at the upper end of said post to fasten said arm to said post in the region of said slot, whereby said threaded fastener may be loosened and said device rotated about an axis parallel to said pins to remove said arm from or place said arm in position to be fastened and connected to said post by the tightening of said threaded fastener.

3. In combination, an electric discharge device including an array of external connector pins extending therefrom in generally parallel relation, a plurality of elongated terminals arranged in an array outside said array of connector pins, a plurality of flat mounting straps of conducting material for supporting said discharge device and electrically connecting said pins to corresponding ends of said terminals, a supporting member having the opposite ends of said terminals secured therein whereby the full lengths of said straps are supported in spaced relation to said supporting member, each of said straps being fixedly secured at one end to one of said pins and being flexible in a direction substantially coextensive with said pins, said strap extending outwardly in a direction transverse to the direction of said pins and being spaced to engage the array of terminals on which the device is to be supported.

4. In combination, an electric discharge device having a plurality of connector pins extending therefrom and an electrically connecting and mounting structure for securing said device to a support, said structure comprising a terminal member on said support, a flexible conductive arm having an opening in one end thereof and a slot transverse to the axis of said arm in the other end, a flanged eyelet surrounding one of said pins and fixed thereto, said eyelet projecting through said opening and fixed to said arm, and releasable means for fastening said arm to said terminal member, whereby upon release of said fastening means, said device can be rotated about an axis parallel to said pins to remove said arm from said terminal member.

5. In combination, an electric discharge device having a plurality of external connector pins extending therefrom in substantially parallel relation and a connecting shock mount for supporting said device and connecting said connector pins to a plurality of spaced terminals, said shock mount comprising a plurality of metal straps at least three in number and each being rigidly fastened at one end thereof to one of said pins and extending laterally from said one pin, said straps being flexible in a direction substantially coextensive with said pins, a transverse slot being defined in the corresponding side edges of each of said straps at the end thereof opposite said one end, whereby said discharge device may be rotated substantially about its axis to move said slots onto said terminals.

6. A compact shock proof and heat dissipating structure for detachably mounting multiple electrode hot cathode electron discharge tubes on a tube supporting body and establishing electrical connections between the wiring terminals of said body and the tube electrodes comprising, relatively stiff lead-in rods for all the tube electrodes passing through gas tight seals in a substantially flat sealing base of the tube envelope, a plurality of supporting elements of relatively thin strips of metal of good electrical conductivity for bodily supporting said tube and for establishing electrical connections between the terminals of the tube supporting body and the tube electrodes, said supporting elements having body portions disposed flatwise in approximately the same plane generally parallel with the sealing base of the envelope, each of said supporting elements being directly and rigidly attached by fused metal to a corresponding one of said lead-in rods and having end portions with openings therein for screw threaded elements to make detachable clamped connections of low contact resistance with corresponding terminals of the tube supporting body, said supporting elements being exposed to the outside air for dissipation of heat, and also having a shape and cross section effective to attenuate transmission of shocks and vibration from the tube supporting body to the tube likely to be damaging to its structural elements.

7. A mounting structure for detachably supporting on a tube supporting body a gas tube having a hot cathode and anode assuming relatively high temperatures during operation of the tube, said structure comprising in combination with relatively stiff lead-in rods for all the tube electrodes sealed in one end of the tube envelope, an assembly of relatively stiff resilient supporting elements for bodily supporting said tube on a tube supporting body and establishing exposed heat dissipating electrical connections between the wiring terminals of said supporting body and said electrode lead-in rods, said supporting elements being directly and rigidly attached by fused metal to said lead-in rods and having end portions for detachable connections of low contact resistance with the terminals of the tube supporting body, said end portions of said supporting elements having openings therein for screw threaded elements to form such detachable electrical connections by clamping together opposed contacting surfaces, said openings having a distinctive pattern of space relationship permitting mounting of the tube in only one predetermined position, said supporting elements having a shape and cross section to provide resiliency and damping to attenuate transmission of shocks and vibrations injurious to the structural elements of the tube.

References Cited in the file of this patent

UNITED STATES PATENTS

| | | |
|---|---|---|
| 971,203 | Lawrence | Sept. 27, 1910 |
| 1,704,515 | Rau | Mar. 5, 1929 |
| 1,819,835 | Campbell | Aug. 18, 1931 |
| 2,120,396 | Domaleski | June 14, 1938 |
| 2,270,126 | Johnson | Jan. 13, 1942 |
| 2,490,037 | Deiss | Dec. 6, 1949 |

FOREIGN PATENTS

| | | |
|---|---|---|
| 252,315 | Great Britain | Feb. 25, 1927 |
| 476,210 | Germany | May 13, 1929 |